United States Patent
Shaffer et al.

(10) Patent No.: US 7,557,170 B2
(45) Date of Patent: Jul. 7, 2009

(54) METHOD FOR REDUCING DEPOSITIONS IN POLYMERIZATION VESSELS

(75) Inventors: Timothy D. Shaffer, Hackettstown, NJ (US); Pamela J. Wright, Easton, PA (US); J. Davis Deborah, Pasadena, TX (US); Michael F. McDonald, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/179,375

(22) Filed: Jul. 24, 2008

(65) Prior Publication Data

US 2009/0062484 A1  Mar. 5, 2009

Related U.S. Application Data

(60) Provisional application No. 60/969,268, filed on Aug. 31, 2007.

(51) Int. Cl.
*C08F 2/00* (2006.01)
*C08F 10/10* (2006.01)

(52) U.S. Cl. .................. 526/62; 526/348.7

(58) Field of Classification Search .......... 526/62, 526/348.7
See application file for complete search history.

(56) References Cited

U.S. PATENT DOCUMENTS 3,923,765 A 12/1975 Goetze et al.
4,049,895 A 9/1977 McOnie et al.
4,192,934 A 3/1980 Takahashi et al.
4,758,639 A 7/1988 Koyanagi et al.
5,191,044 A * 3/1993 Rath et al. .................. 526/212
2005/0095176 A1 5/2005 Hottovy
2005/0277748 A1 12/2005 Kimoto et al.
2007/0066770 A1* 3/2007 Fouarge et al. .............. 526/64
2007/0187078 A1 8/2007 Greaney et al.

FOREIGN PATENT DOCUMENTS

EP  0 107 127  2/1984
EP  0 320 263  6/1989
EP  0 343 919  11/1989

OTHER PUBLICATIONS

N.K.Myshkin et al., *Surface Roughness and Texture Analysis in Microscale*, 254 Wear 1001-1009 (2003).
J. Rudzitis et al., *Automated System for Three-Dimensional Roughness Testing, Initiatives of Precision Engineering at the Beginning of the Millennium*, 10th International Conference on Precision Engineering, Jul. 18-20, 2001, Yokohama, Japan (Springer, US 2002).

* cited by examiner

*Primary Examiner*—Fred M Teskin
(74) *Attorney, Agent, or Firm*—Nancy T. Krawczyk

(57) ABSTRACT

The method of polymerization includes the steps of a) providing a catalyst system, b) providing at least one monomer or comonomer mixture in a reaction vessel, c) introducing the catalyst into the reaction vessel, and d) polymerizing the at least one monomer or comonomer mixture to produce an isoolefin polymer. The catalyst may be soluble in the diluent used for polymerization. The polymerization contact surfaces of the reaction vessel have an arithmetic average surface roughness of less than 0.3 µm (12 microinches).

20 Claims, 1 Drawing Sheet

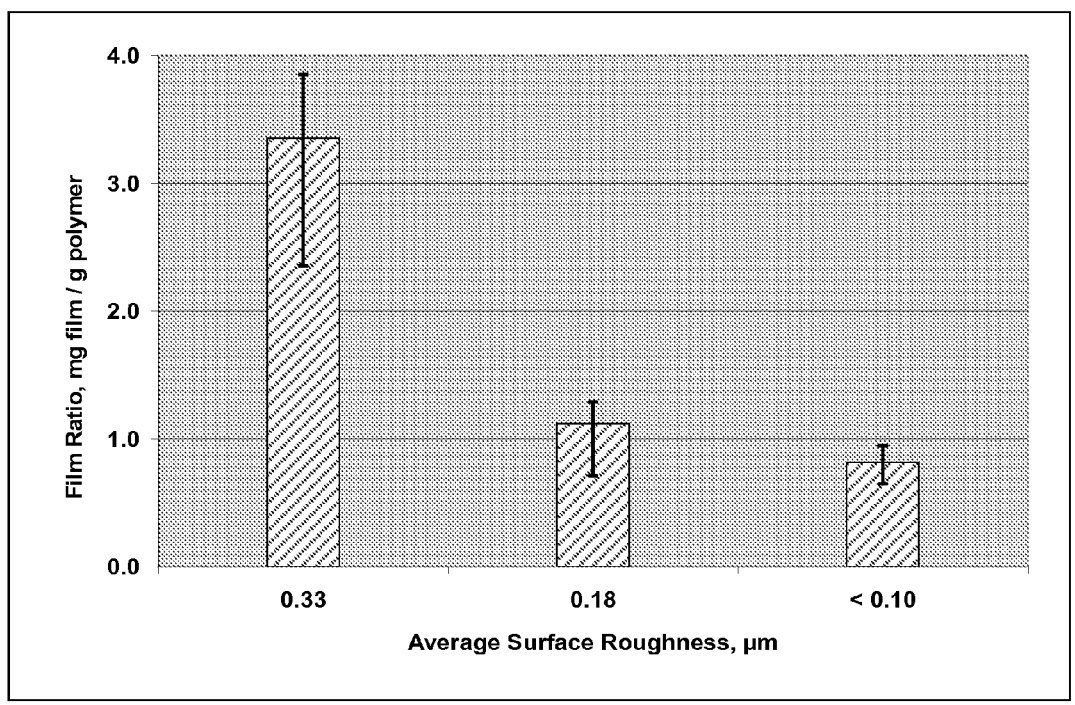
FIGURE

METHOD FOR REDUCING DEPOSITIONS IN POLYMERIZATION VESSELS

CROSS REFERENCE TO RELATED APPLICATION

This application relates to and claims priority to U.S. Provisional Patent Application No. 60/969,268 entitled "Method for Reducing Depositions in Polymerization Vessels" which was filed on Aug. 31, 2007, the disclosure of which is incorporated herein by reference.

FIELD OF THE INVENTION

This invention relates to a method of reducing polymer depositions that occur during polymerizations. More specifically, the present invention relates to a method of reducing polymer buildup on the interior walls of reaction vessels employing dissolved catalysts. Even more specifically, the present invention relates to a method of reducing polymer film depositions on the interior walls of reaction vessels during low temperature polymerization employing dissolved catalysts.

BACKGROUND OF THE INVENTION

Isoolefin polymers are prepared in carbocationic polymerization processes, generally under low temperatures in the range of 0° C. to −150° C. Due to the heat generated during polymerization, various methods are used to remove the heat generated during polymerization. These various methods all require large surface area for heat transfer so the temperature of the polymerization slurry remains constant or nearly constant.

However, during some polymerizations, there can be a number of issues that arise during the process. First, there is a tendency of the polymer to form or deposit on the reactor surfaces. This manner of polymer formation or deposition occurs when the polymer accumulates directly on the reactor surfaces, and is referred to herein as "film deposition" or "deposition." The rate of polymer film deposition on the reactor surfaces is generally proportional to the rate of polymerization, whereas particle agglomeration depends more on the characteristics of the slurry, flow conditions, particle adhesion, etc. As the film deposition accumulates, the heat transfer coefficient between the reactor slurry and the refrigerant decreases, leading to an increase in the polymerization temperature of the reactor slurry. As the reactor slurry temperature increases, the polymerization process becomes less stable since it is more difficult to achieve the desired molecular weight of the polymer product.

Additionally, during carbocationic polymerization processes, there can be a tendency of the polymer particles in the reactor to agglomerate with each other and to collect on the reactor wall, heat transfer surfaces, impeller(s), and the agitator(s)/pump(s). This is referred to herein as "polymer agglomeration," "particle agglomeration," or "agglomeration." The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained. Others have attempted to address these problems in reaction vessels. Several examples are US Patent Application 2005/0095176 (Hottovy), US Patent Application 2005/0277748 (Kimoto et al), and EP 0 107 127 A1 (Sumitomo).

Hottovy discloses a loop reactor wherein the goal is to prevent the creation of fine particulates, or fines, during olefin polymerization wherein the process is suitable for the copolymerization of ethylene and a higher 1-olefin. A first polymerization is generated that actually creates a film/coating on the reactor walls so that larger particulates formed during the desired polymerization are not broken or chipped by a non-smooth reactor wall.

Kimoto et al discloses a method of polymerizing an olefinic monomer system with a catalyst. The olefinic monomer system is comprised of a single monomer or a combination of two or more monomers wherein monomers are defined as ethylene and higher 1-olefins. The polymerization reactor has an inner surface whose arithmetic mean surface roughness of 1.0 μm or less. In the disclosed polymerizations, the agglomeration and film deposition was also avoided by the use of a solid catalyst.

Sumitomo discloses a process for olefinic polymerization in which the reaction vessels are finished to a defined surface roughness of 2.5 μm or less. Sumitomo discloses that the polymerization process employs a solid catalyst and specifically teaches that the catalyst must be of a defined size to minimize any buildup on the reaction vessel. Additionally, an agent is added to the vessel to assist in reducing polymer buildup. In the disclosed polymerizations, the monomer systems employ ethylene and higher 1-olefins as monomers.

Additional references of interest include: U.S. Pat. Nos. 3,923,765; 4,049,895; and 4,192934.

SUMMARY OF THE INVENTION

This invention relates to polymerization methods and systems wherein film deposition and agglomeration on the reaction vessel walls and heat transfer surfaces is reduced. In one embodiment, this invention relates to the reduction of film deposition and agglomeration in polymerization systems employing a dissolved catalyst. In another embodiment, this invention relates to the reduction of film deposition and agglomeration in low temperature polymerization systems.

Disclosed herein is a method of producing an isoolefin polymer by polymerization. The method comprising the steps of a) dissolving a catalyst system, b) providing at least one monomer or comonomer mixture in a reaction vessel, c) introducing the dissolved catalyst into the reaction vessel, and d) polymerizing the at least one monomer or comonomer mixture to produce an isoolefin polymer. A majority of the polymerization contact surfaces in the reaction vessel have an arithmetic average surface roughness of less than 0.3 μm.

In another aspect of the disclosed method, the polymerization contact walls of the reaction vessel have an arithmetic average surface roughness of less than 0.2 μm. In another embodiment, the contact surfaces have an arithmetic average surface roughness of less than 0.1 μm. In yet another embodiment, the polymerization contact surfaces have an arithmetic average surface roughness in the range of 0.10 μm to 0.2 μm.

In another embodiment of the disclosed polymerization method, the polymerization is a carbocationic polymerization.

In yet another embodiment of the disclosed polymerization method, the polymerization is a slurry polymerization process.

In one aspect of the disclosed polymerization, and in combination with any of the above disclosed embodiments or aspects, the catalyst employed in the polymerization is dissolved in a diluent and has a solubility in the diluent of at least 95%. In another embodiment, the catalyst has a solubility in the selected diluent of at least 99%.

In another aspect of the disclosed polymerization, and in combination with any of the above disclosed embodiments or aspects, the polymerization occurs at a temperature of less than 0° C. In one embodiment, the polymerization temperature is between −10° C. and the freezing point of the polymerization mixture.

In another aspect of the disclosed polymerization, and in combination with any of the above disclosed embodiments or aspects, the step of providing a catalyst system comprises dissolving the catalyst prior to mixing the catalyst with the polymerizing agent.

In another aspect of the disclosed polymerization, and in combination with any of the above disclosed embodiments or aspects, the monomer or comonomer mixture is selected from the group consisting of hydrocarbon monomers, homopolymers, copolymers, interpolymers, and terpolymers. In one embodiment, the comonomer mixture comprises a $C_4$ to $C_6$ isoolefin monomer and a multiolefin.

Also disclosed herein is a method of producing an isoolefin polymer by polymerization at low temperatures. The method includes the steps of a) providing a catalyst system, b) providing at least one monomer or comonomer mixture in a reaction vessel, c) combining the catalyst system and the polymerizing agent into the reaction vessel, and d) polymerizing the monomer or comonomer mixture to produce an isoolefin polymer. The polymerization occurs at a temperature of less than 0° C. Additionally, the majority of the polymerization contact surfaces in the reaction vessel have an arithmetic average surface roughness of less than 0.3 µm.

In one aspect of the disclosed low temperature polymerization method, the polymerization contact surfaces have an arithmetic average surface roughness of less than 0.2 µm.

In yet another aspect of the low temperature polymerization, the polymerization contact surfaces of the reaction vessel have an arithmetic average surface roughness of less than 0.1 µm.

In yet another aspect of the low temperature polymerization, the polymerization contact surfaces of the reaction vessel have an arithmetic average surface roughness in the range of 0.10 µm to 0.2 µm.

In one disclosed aspect of the above low temperature polymerization or any of the above noted aspects thereof, the polymerization temperature is between −10° C. and the freezing point of the polymerization mixture. In one embodiment, the polymerization temperature is between −25° C. and −120 ° C.

BRIEF DESCRIPTION OF THE FIGURES

The invention will be described by way of example and with reference to the accompanying FIGURE which is a graph of the vessel surface roughness versus film ratio.

DETAILED DESCRIPTION

Various specific embodiments, versions and examples of the invention will now be described, including preferred embodiments and definitions that are adopted herein for purposes of understanding the claimed invention. For determining infringement, the scope of the "invention" will refer to any one or more of the appended claims, including their equivalents, and elements or limitations that are equivalent to those that are recited.

This invention relates to polymerization methods and systems wherein film deposition and agglomeration of the reaction vessel walls and heat transfer surfaces is reduced. In another embodiment, this invention relates to the reduction of film deposition and agglomeration in low temperature polymerization systems. In yet another embodiment, this invention relates to the reduction of film deposition and agglomeration in polymerization systems employing a complexed, or dissolved, catalyst.

Monomers useful in the carbocationic olefin polymerization include any hydrocarbon monomer that is polymerizable using this invention. Preferred monomers include one or more of olefins, alpha-olefins, disubstituted olefins, isoolefins, conjugated dienes, non-conjugated dienes, styrenics and/or substituted styrenics, and vinyl ethers. Isoolefin refers to any olefin monomer having two substitutions on the same carbon while multiolefin refers to any monomer having two double bonds. The styrenic may be substituted (on the ring) with an alkyl, aryl, halide, or alkoxide group. Preferably, the monomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, β-pinene, myrcene, 6,6-dimethyl-fulvene, hexadiene, cyclopentadiene, piperylene, methyl vinyl ether, ethyl vinyl ether, isobutyl vinyl ether, and the like. Monomer may also be combinations of two or more monomers. Styrenic block copolymers may also be used as monomers. Preferred block copolymers include copolymers of styrenics, such as styrene, para-methylstyrene, alpha-methylstyrene, and $C_4$ to $C_{30}$ diolefins, such as isoprene, butadiene, and the like. Particularly preferred monomer combinations include isobutylene and para-methyl styrene; isobutylene and isoprene; as well as homopolymers of isobutylene.

The monomers may be present in the polymerization medium in an amount ranging from 75 wt % to 0.01 wt % in one embodiment, alternatively 60 wt % to 0.1 wt %, alternatively from 40 wt % to 0.2 wt %, alternatively 30 to 0.5 wt %, alternatively 20 wt % to 0.8 wt %, and alternatively from 15 wt % to 1 wt % in another embodiment.

Isoolefin polymers are prepared in carbocationic polymerization processes. Of special importance is butyl rubber which is a copolymer of isobutylene with a small amount of isoprene. Butyl rubber is made by low temperature cationic polymerization that generally requires that the isobutylene have a purity of greater than 99.5 wt % and the isoprene have a purity of greater than 98.0 wt % to prepare high molecular weight butyl rubber.

In one embodiment, butyl polymers are prepared by reacting a comonomer mixture, the mixture having at least (1) a $C_4$ to $C_6$ isoolefin monomer component such as isobutylene with (2) a multiolefin, or conjugated diene monomer component. The $C_4$ to $C_6$ isoolefin may be one or more of isobutylene, 2-methyl-1-butene, 3-methyl-1-butene, 2-methyl-2-butene, and 4-methyl-1-pentene. The multiolefin may be a $C_4$ to $C_{14}$ conjugated diene such as isoprene, butadiene, 2,3-dimethyl-1,3-butadiene, β-pinene, myrcene, 6,6-dimethyl-fulvene, hexadiene, cyclopentadiene, and piperylene.

The disclosed polymerization process may also result in terpolymers and tetrapolymers comprising any combination of the monomers listed above. Preferred terpolymers and tetrapolymers include polymers comprising isobutylene, isoprene and divinylbenzene; polymers comprising isobutylene, para-alkylstyrene (preferably paramethyl styrene), and isoprene; polymers comprising cyclopentadiene, isobutylene, and paraalkyl styrene (preferably paramethyl styrene); polymers of isobutylene cyclopentadiene, and isoprene; polymers comprising cyclopentadiene, isobutylene, and methyl cyclopentadiene; and polymers comprising isobutylene, paramethylstyrene, and cyclopentadiene.

Catalysts systems useful for the disclosed polymerization process include any Lewis acid(s) or other metal complex(es) used to catalyze the polymerization of the monomers described above, and may include at least one initiator, and optionally other minor catalyst component(s). Additionally, the components of the catalyst system are soluble in the diluent used for the polymerization. When referring to the solubility of the catalyst components, what is meant is the ability of the component to dissolve or blend uniformly in the diluent, becoming molecularly or ionically dispersed in the diluent. The catalyst components should have a solubility in the diluent such that at least 95% of the component is molecularly or ionically dispersed in the diluent. In another embodiment, the catalyst components have at least a 98% solubility; and in still another embodiment, the catalyst components have at least a 99% solubility; and in still yet another embodiment, the catalyst components have at least a 99.5% solubility.

The Lewis acid (also referred to as the co-initiator or catalyst) may be any Lewis acid based on metals from Group 4, 5, 13, 14, and 15 of the Periodic Table of the Elements, including boron, aluminum, gallium, indium, titanium, zirconium, tin, vanadium, arsenic, antimony, and bismuth. One skilled in the art will recognize that some elements are better suited in the practice of the invention. In one embodiment, the metals are aluminum, boron and titanium, with aluminum being desirable. Illustrative examples include $AlCl_3$, $(alkyl)AlCl_2$, $(C_2H_5)_2AlCl$, $(C_2H_5)_3Al_2Cl_3$, $BF_3$, $SnCl_4$, and $TiCl_4$. Particularly preferred Lewis acids may be any of those useful in cationic polymerization of isobutylene copolymers including: aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, and titanium tetrachloride, etc. with ethylaluminum dichloride and ethylaluminum sesquichloride being preferred. Lewis acids such as methylaluminoxane (MAO) and specifically designed weakly coordinating Lewis acids such as $B(C_6F_5)_3$ are also suitable Lewis acids within the context of the invention.

Initiators useful in this invention are those initiators which are soluble in a suitable diluent with the chosen Lewis acid to yield a complex which rapidly reacts with the selected monomers to form a propagating polymer chain. Illustrative examples include Brønsted acids such as $H_2O$, HCl, RCOOH (wherein R is an alkyl group), alkyl halides, such as $(CH_3)_3CCl$, $C_6H_5C(CH_3)_2Cl$, and 2-Chloro-2,4,4-trimethylpentane. More recently, transition metal complexes, such as metallocenes and other such materials that can act as single site catalyst systems, such as when activated with weakly coordinating Lewis acids or Lewis acid salts have been used to initiate isobutylene polymerization.

In a preferred embodiment, the Lewis acid is present at anywhere from about 0.1 times the moles of initiator present to about 200 times the moles of initiator present. In a further preferred embodiment, the Lewis acid is present at anywhere from about 0.8 times the moles of initiator present to about 20 times the moles of initiator present. In a preferred embodiment the initiator is present at anywhere from about 0.1 moles per liter to about $10^{-6}$ moles per liter. It is of course understood that greater or lesser amounts of initiator are still within the scope of this invention.

The amount of the catalyst employed will depend on the desired molecular weight and molecular weight distribution of the polymer being produced. Typically the range will be from about $1\times10^{-6}$ moles per liter to $3\times10^{-2}$ moles per liter and most preferably from $1\times10^{-4}$ to $1\times10^{-3}$ moles per liter.

In one embodiment, the reactor and the catalyst system are substantially free of water. Substantially free of water is defined as less than 30 ppm (based upon total weight of the catalyst system), preferably less than 20 ppm, preferably less than 10 ppm, preferably less than 5 ppm, preferably less than 1 ppm. However, when water is selected as an initiator, it is added to the catalyst system to be present at greater than 30 ppm, preferably greater than 40 ppm, and even more preferably greater than 50 ppm (based upon total weight of the catalyst system).

The diluent or diluent mixture is selected based upon its solubility in the polymer. Certain diluents are soluble in the polymer. Preferred diluents have little to no solubility in the polymer.

Suitable diluents in the present disclosure include halogenated hydrocarbons, especially chlorinated and/or fluorinated hydrocarbons and the like. Specific examples include but are not limited to the halogenated versions of propane, isobutane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, and meta-xylene, preferably the chlorinated versions of the above, and more preferably fluorinated versions of all of the above. Brominated versions of the above are also useful. Specific examples include, methyl chloride, methylene chloride, ethyl chloride, propyl chloride, butyl chloride, chloroform, and the like.

Hydrofluorocarbon(s) can be used as diluents in the present disclosure, alone or in combination with diluents. For purposes of this disclosure and the claims thereto, hydrofluorocarbons ("HFCs" or "HFC") are defined to be saturated or unsaturated compounds consisting essentially of hydrogen, carbon and fluorine, provided that at least one carbon, at least one hydrogen and at least one fluorine are present. Specific examples include fluoromethane, difluoromethane, trifluoromethane, 1,1-difluoroethane, 1,1,1-trifluoroethane, and 1,1,1,2-tetrafluoroethane. In one embodiment, the HFC is used in combination with a chlorinated hydrocarbon such as methyl chloride. Additional embodiments include using the HFC in combination with hexanes or methyl chloride and hexanes. In another embodiment the diluents such as HFCs are used in combination with one or more gases inert to the polymerization such as carbon dioxide, nitrogen, hydrogen, argon, neon, helium, krypton, xenon, and/or other inert gases that are preferably liquid at entry to the reactor. Preferred gases include carbon dioxide and/or nitrogen.

In one embodiment, the diluent comprises non-perfluorinated compounds or the diluent is a non-perfluorinated diluent. Perfluorinated compounds consist of carbon and fluorine. However, in another embodiment, when the diluent comprises a blend, the blend may comprise perfluorinated compounds, preferably, the catalyst, monomer, and diluent are present in a single phase or the aforementioned components are miscible with the diluent as described in further detail below. In another embodiment, the blend may also comprise those compounds consisting of chlorine, fluorine, and carbon.

In another embodiment, non-reactive olefins may be used as diluents in combination with other diluents such as HFCs. Examples include, but are not limited to, ethylene, propylene, and the like.

In another embodiment the diluents, including HFCs, are used in combination with one or more nitrated alkanes, including $C_1$ to $C_{40}$ nitrated linear, cyclic, or branched alkanes. Preferred nitrated alkanes include, but are not limited to, nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above.

The polymerization process may be practiced in continuous or batch processes. Possible reactors for the process include any reactor selected from the group consisting of a continuous flow stirred tank reactor, a plug flow reactor, a tubular reactor, and an autorefrigerated boiling-pool reactor.

During polymerization, heat is removed by use of heat transfer surfaces, wherein polymerization occurs on one side of the heat transfer surface and the coolant is present on the other side. An example is a reactor where tubes containing coolant run inside the reactor polymerization zone. Another example would be where the polymerization occurs inside a tube and the coolant is present on the outside of the tube in a shell.

This invention may also be practiced in batch reactors where the monomers, diluent, and catalyst are charged to the reactor and then polymerization proceeds to completion (such as by quenching) and the polymer is then recovered.

In certain embodiments, the invention is practiced using a slurry polymerization process. The polymerization is carried-out in a continuous polymerization process in which the catalyst, monomer(s), and diluent are present as a single phase. In slurry polymerization, the monomers, catalyst(s), and initiator(s) are all miscible in the diluent or diluent mixture, i.e., constitute a single phase, while the polymer precipitates from the diluent with good separation from the diluent.

When using a continuous flow stirred tank-type reactor, the reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents, and catalysts (combined or separately), temperature sensing means, and an effluent overflow or outflow pipe which withdraws polymer, diluent, and unreacted monomers among other things, to a holding drum or quench tank. Preferably, the reactor is purged of air and moisture.

The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

In accordance with the invention, to reduce film deposition and agglomeration on the heat transfer surfaces of the reaction vessel, whether such heat transfer surfaces are the interior surfaces/walls of a large vessel, or interior or exterior walls/surfaces of heat exchange tubes in a reaction vessel, the heat transfer surfaces are finished to have an arithmetic average surface roughness (Ra) of not more than 0.5 µm (20 microinches), preferably not more than 0.3 µm (12 microinches). In still another embodiment, the arithmetic average surface roughness of the heat exchange surfaces is not more than 0.20 µm (7.5 microinches). In still yet another embodiment, the arithmetic average surface roughness is not more than 0.10 µm (4 microinches).

The heat transfer surfaces of the vessel, in accordance with this invention, include all surfaces contained within the reaction vessel (exclusive of any feed stream inlet, overflow, or discharge piping) that might have contact with the components of the polymerization system immediately before, during, and after polymerization occurs and which are capable of heat transfer. At a minimum, at least 50% of all heat transfer surfaces in the reaction vessel are finished to the above desired arithmetic average surface roughness. Preferably, at least 80% of all heat transfer surfaces in the vessel have the desired finish. Even more preferably, at least 95% of all heat transfer surfaces in the vessel have the desired finish. In a large reaction vessel, for relatively low slurry levels, not all of the heat transfer surfaces of the reaction vessel may have active contact with the slurry. Those surfaces which contact the slurry may also be defined as the polymerization contact surfaces. A majority of the polymerization contact surfaces are finished to the above desired arithmetic average surface roughness. In one embodiment, at least 80% of the polymerization contact surfaces are finished to the above desired arithmetic average surface roughness. In another embodiment, at least 90%, most preferably at least 97%, of the polymerization contact surfaces are finished to the above desired arithmetic average surface roughness.

Other surfaces of the reaction vessel that have contact with the components of the polymerization mixture, such as a tank agitator, may also have a finish with the above average surface roughness values. Achieving the desired average surface roughness values may be accomplished by micropolishing the vessel surface. Additionally, if necessary, after the reaction vessel has been in operation for a period of time, it may be necessary to refinish the heat transfer surfaces of the vessel. At such time, the surfaces should be refinished to the above noted arithmetic average surface roughness.

The polymerization reaction temperature is selected based on the target polymer molecular weight and the monomer to be polymerized as well as process and economic considerations, e.g., rate, temperature control, etc. The temperature for the polymerization is less than 0° C., preferably between –10° C. and the freezing point of the slurry in one embodiment, and from –25° C. to –120° C. in another embodiment. In yet another embodiment, the polymerization temperature is from –40° C. to –100° C., and from –70° C. to –100° C. in yet another embodiment. In yet another desirable embodiment, the temperature range is from –80° C. to –100° C. Different reaction conditions will produce products of different molecular weights. Synthesis of the desired reaction product may be achieved through monitoring the course of the reaction by the examination of samples taken periodically during the reaction.

In one embodiment, the polymerization temperature is within 10° C. above the freezing point of the diluent, in another embodiment within 8° C. above the freezing point of the diluent, in yet another embodiment within 6° C. above the freezing point of the diluent, in still another embodiment within 4° C. above the freezing point of the diluent, in a further embodiment within 2° C. above the freezing point of the diluent, in another embodiment within 1° C. above the freezing point of the diluent.

The order of contacting the monomer feed-stream, catalyst, initiator, and diluent may vary. In one embodiment, the initiator and Lewis acid are pre-complexed by mixing together in the selected diluent for a prescribed amount of time ranging from 0.01 second to 10 hours, and then is injected into the continuous reactor through a catalyst nozzle or injection apparatus. In another embodiment, a Lewis acid and the initiator are added to the reactor separately. In yet another embodiment, the initiator is blended with the feed monomers before injection to the reactor. Desirably, the monomer is not contacted with the Lewis acid, or the Lewis acid combined with the initiator before the monomers enter the reactor. In all of the disclosed processes, the catalyst is dissolved either prior to introduction with the monomer or comonomer mixture or after introduction with the monomer or comonomer mixture.

When the initiator and Lewis acid are allowed to pre-complex by mixing together in the selected diluent, this occurs at temperatures between 80° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor.

The overall residence time in the reactor can vary. The time being dependant on many factors, including, but not limited to, catalyst activity and concentration, monomer concentration, feed injection rate, production rate, reaction temperature, and desired molecular weight. Residence time will generally be between about a few seconds and five hours, and typically between about 10 and 60 minutes. Variables influencing residence time include the monomer and diluent feed injection rates and the overall reactor volume.

The catalyst to monomer ratio utilized will be those conventional in this art for carbocationic polymerization processes. In one embodiment of the invention, the monomer to catalyst mole ratios will typically be from 500 to 10000, and in the range of 2000 to 6500 in another embodiment. In yet another desirable embodiment, the mole ratio of Lewis acid to initiator is from 0.5 to 10, or from 0.75 to 8. The overall concentration of the initiator in the reactor is typically from 5 to 300 ppm or 10 to 250 ppm. The concentration of the initiator in the catalyst feed stream is typically from 50 to 3000 ppm in one embodiment. Another way to describe the amount of initiator in the reactor is by its amount relative to the polymer. In one embodiment, there is from 0.25 to 20 moles polymer/mole initiator and from 0.5 to 12 mole polymer/mole initiator in another embodiment.

The reactor will contain sufficient amounts of the catalyst system to catalyze the polymerization of the monomer containing feed-stream such that a sufficient amount of polymer having desired characteristics is produced. The feed-stream in one embodiment contains a total monomer concentration greater than 20 wt % (based on the total weight of the monomers, diluent, and catalyst system), greater than 25 wt % in another embodiment. In yet another embodiment, the feed-stream will contain from 30 wt % to 50 wt % monomer concentration based on the total weight of monomer, diluent, and catalyst system.

Catalyst efficiency (based on Lewis acid) in the reactor is maintained between 10,000 pounds of polymer per pound of catalyst and 300 pounds of polymer per pound of catalyst and desirably in the range of 4000 pounds of polymer per pound of catalyst to 1000 pounds of polymer per pound of catalyst by controlling the molar ratio of Lewis acid to initiator.

In one embodiment, the polymerization of cationically polymerizable monomers (such as polymerization of isobutylene and isoprene to form butyl rubber) comprises several steps. First, a reactor having a pump impeller capable of up-pumping or down-pumping is provided. The pump impeller is typically driven by an electric motor with a measurable amperage. The reactor typically is equipped with parallel vertical reaction tubes within a jacket containing liquid ethylene. The total internal volume, including the tubes, is greater than 30 to 50 liters, more typically 5,000 to 8,000 liters, thus capable of large scale volume polymerization reactions. The reactor typically uses liquid ethylene to draw the heat of the polymerization reaction away from the forming slurry. The pump impeller keeps a constant flow of slurry, diluent, catalyst system, and unreacted monomers through the reaction tubes. A feed-stream of the cationically polymerizable monomer(s) (such as isoprene and isobutylene) in a polar diluent is charged into the reactor, the feed-stream containing less than 0.0005 wt % of cation producing silica compounds, and typically free of aromatic monomers. The catalyst system is then charged into the reactor, the catalyst system having a Lewis acid and an initiator present in a molar ratio of from 0.50 to 10.0. Within the reactor, the feed-stream of monomers and catalyst system are allowed to contact one another, the reaction thus forming a slurry of polymer (such as butyl rubber), wherein the solids in the slurry have a concentration of from 20 vol % to 50 vol %. Finally, the thus formed polymer (such as butyl rubber) is allowed to exit the reactor through an outlet or outflow line while simultaneously allowing the feed-stream charging to continue, thus constituting the continuous slurry polymerization. The present invention improves this process in a number of ways, e.g., by ultimately reducing the amount of polymer accumulation on the reactor walls, heat transfer surfaces, agitators and/or impeller(s), and in the outflow line or exit port, as measured by pressure inconsistencies or "jumps."

In one embodiment, the resultant polymer is a polyisobutylene/isoprene polymer (butyl rubber) that has a molecular weight distribution of from about 2 to 5, and an unsaturation of from 0.5 to 2.5 mole per 100 mole of monomer. This product may be subjected to subsequent halogenation to afford a halogenated butyl rubber.

The present invention will now be illustrated by means of the following examples.

Polymerizations were conducted in a laboratory-scale continuous reactor constructed of stainless steel and designed to permit the introduction of monomer and catalyst feeds as well as the continuous removal of the polymer product. Mixing was provided by a three-bladed impeller mounted on a stainless steel shaft and driven by an external electric motor. The motor was run at 1200 to 1600 rpm. The reactor was also equipped with a thermocouple to monitor the temperature of the reactor contents. The reactor was cooled to the desired reaction temperature by immersing the assembled reactor into a pentane or isohexane bath in an inert atmosphere glove box. The temperature of the stirred hydrocarbon bath was controlled to ±2° C. All apparatus in liquid contact with the reaction medium were dried at 120° C. and cooled in a nitrogen atmosphere before use.

Three reactors, which differed only by the internal surface finish of the reactor, were used in the polymerization examples below. One reactor was used as received. The two other reactors were electropolished to different final surface finishes as characterized by the arithmetic average surface roughness, $R_a$. The arithmetic average surface roughness was measured on each reactor using a Mahr Pocket Surf profilometer. Between six and twenty-one separate measurements were taken on at least six different areas of the reactor surface. The $R_a$ values obtained from each of these measurements were then averaged and are presented in Table 1 for each reactor, along with the standard deviation of these values.

TABLE 1

| Reactor | Average $R_a$, μm | +/− |
|---|---|---|
| A | 0.33 | 0.09 |
| B | 0.18 | 0.04 |
| C | 0.10 | 0.04 |

Isobutylene (Matheson or ExxonMobil) and methyl chloride (Air Gas) were dried by passing the gas through three stainless steel columns containing barium oxide and were condensed and collected as liquids in the glove box. Alternatively, methyl chloride was dried by the addition of triethylaluminum to the liquid at low temperature and subsequently distilling the methyl chloride from this solution under its own vapor pressure. 1,1,1,2-Tetrafluoroethane (134a) (National Refrigerants) was dried by passing the gas through three stainless steel columns containing 3 Å molecular sieves and was condensed and collected as a liquid in the glove box. Isoprene (Aldrich) was either distilled prior to use or used as received. Isoprene was charged to the monomer feed at 2.8 wt. % with respect to isobutylene. HCl solutions were prepared in either methyl chloride or 134a by dissolving gaseous HCl (Aldrich, 99% pure) into the condensed liquid at low temperature. The concentration of the HCl in these prepared solutions was determined by standard titration techniques. In the examples below, the diluent composition referred to as the "blend" is a 50/50 wt/wt mixture of 134a and methyl chloride.

The slurry copolymerizations were performed by first preparing the monomer and catalyst feeds. The monomer feed was prepared in a glass or metal reservoir and comprised isobutylene, isoprene, the selected diluent, and ethanol. A catalyst feed was prepared for each copolymerization in a separate reservoir. The catalyst feed was prepared by adding a predetermined amount of the stock HCl solution and a hydrocarbon solution of ethylaluminum dichloride (EADC). The EADC/HCl molar ratio in the catalyst feed for all examples was 3.0.

An initial monomer feed was also prepared and charged into the reactor for the purpose of starting the polymerization run. The concentration of monomer in this initial charge was 10 wt. % isobutylene. Isoprene was also charged to this initial monomer feed at 2.8 wt % relative to isobutylene. All feeds were chilled to the same temperature as the reactor using the chilled hydrocarbon bath of the glove box. Polymerizations in the blend were conducted at a reactor temperature of about −75° C.±3° C. Near the beginning of the polymerization, the temperature of the bath was lowered a few degrees to provide an initial difference in temperature between the bath and the reactor contents. The copolymerizations were begun by introducing the catalyst. The catalyst flow rate was controlled to provide for a constant differential temperature between the reactor and the bath to achieve the target polymerization temperature for the run. Optionally, the temperature of the bath was lowered to aid in achieving the polymerization temperature target. Addition of monomer feed from the reservoir was introduced into the reactor approximately 10 minutes after the reaction commenced as evidenced by the formation of precipitated polymer particles (slurry particles). The run was continued until the monomer feed in the reservoir was exhausted or until the desired amount of monomer feed was consumed. Generally, the average monomer conversion in these runs was better than 75% and at times as high as 99%.

At the end of the run, the contents of the reactor were emptied and the polymer film on the wall of the vessel below the vapor-liquid interface was collected, dried and weighed. The total amount of polymer produced during the run was also collected dried and weighed. A film ratio was then calculated for each run by dividing the mass (in milligrams, mg) of the wall film by the mass (in grams, g) of the total amount of polymer produced in the experiment. The film ratios presented below have the units of mg of film per g of polymer produced. Several examples are presented for each reactor of defined wall smoothness to demonstrate a range of film ratios produced in a given reactor, see Table 2. The data for each reactor of defined wall smoothness can then be averaged and presented in graphical form with error bars indicating the high an low values obtained for the given reactor, see FIGURE.

TABLE 2

| Run Series | Electropolished | Reactor Wall Average $R_a$ (micrometers) | Product Mw | Product MWD | Film Ratio (mg film/g polymer) |
|---|---|---|---|---|---|
| 1 | N | 0.33 | 113 | 3.0 | 2.4 |
| 2 | N | 0.33 | 252 | 3.5 | 3.9 |
| 3 | N | 0.33 | 125 | 2.6 | 3.6 |
| 4 | N | 0.33 | 147 | 3.3 | 3.9 |
| 5 | N | 0.33 | 153 | 2.7 | 3.2 |
| 6 | N | 0.33 | 285 | 2.9 | 3.4 |
| 7 | N | 0.33 | 216 | 2.8 | 3.1 |
| 8 | Y | 0.18 | 209 | 2.9 | 0.71 |
| 9 | Y | 0.18 | 153 | 2.8 | 0.94 |
| 10 | Y | 0.18 | 173 | 3.3 | 0.70 |
| 11 | Y | 0.18 | 136 | 2.9 | 1.98 |
| 12 | Y | 0.18 | 143 | 3.3 | 1.13 |
| 13 | Y | 0.18 | 200 | 3.6 | 1.06 |
| 14 | Y | 0.18 | 165 | 3.1 | 1.29 |
| 15 | Y | 0.18 | 214 | 3.8 | 1.14 |
| 16 | Y | <0.10 | 227 | 3.1 | 0.93 |
| 17 | Y | <0.10 | 294 | 3.3 | 0.87 |
| 18 | Y | <0.10 | 288 | 3.1 | 0.90 |
| 19 | Y | <0.10 | 161 | 3.7 | 0.65 |
| 20 | Y | <0.10 | 153 | 3.6 | 0.63 |
| 21 | Y | <0.10 | 215 | 3.9 | 0.92 |

While an average surface roughness of about 1.0 μm is considered smooth by those in the art, when the average surface roughness is less than about 0.3 μm, the film buildup is significantly reduced. As seen in the FIGURE, for the exemplary polymerizations, the film building up was reduced by almost two-thirds. At the highest level of demonstrated average surface roughness, the 0.33 μm, even with the noted film buildup, the product produced was within the desired product criteria. With the average surface roughness of about 0.18, μm greater amounts of product may be produced before presumably achieving a film buildup comparable to the rougher surface vessel wall. While the above exemplary polymerizations were conducted in a lab scale, the implications for full scale continuous slurry polymerizations can be determined. With a continuous slurry polymerization in a reaction vessel having walls with an arithmetic average surface roughness of not more than 0.20 μm, the rate of film buildup on the vessel walls is reduced. With a greater time lapse before the buildup becomes unacceptable or begins to interfere with the desired polymerization, the continuous slurry process can be operated for a longer time between shut down cleaning times.

We claim:

1. A method of producing an isoolefin polymer by polymerization, the method comprising the steps of dissolving a catalyst system, providing at least one monomer or comonomer mixture comprising at least one isoolefin in a reaction vessel, the reaction vessel having polymerization contact surfaces, the majority of the polymerization contact surfaces having an arithmetic average surface roughness of less than 0.3 μm (12 microinches), introducing the dissolved catalyst into the reaction vessel, and polymerizing the at least one monomer or comonomer mixture to produce an isoolefin polymer.

2. The method as claimed in claim 1 wherein the polymerization contact surfaces of the reaction vessel have an arithmetic average surface roughness of less than 0.2 μm (7.5 microinches).

3. The method as claimed in claim 1 wherein the polymerization contact surfaces of the reaction vessel has with an arithmetic average surface roughness of less than 0.1 μm (4 microinches).

4. The method as claimed in claim 1 wherein the polymerization contact surfaces of the reaction vessel have an arithmetic average surface roughness in the range of 0.10 μm (4 microinches) to 0.2 μm (7.5 microinches).

5. The method as claimed in claim 1 wherein at least 80% of the polymerization contact surfaces have an arithmetic average surface roughness of less than 0.3 μm (12 microinches).

6. The method as claimed in claim 1, wherein the polymerization contact surfaces have been electropolished to have an arithmetic average surface roughness of less than 0.3 μm (12 microinches).

7. The method as claimed in claim 1 wherein the polymerization is a carbocationic polymerization.

8. The method as claimed in claim 1 wherein the polymerization is a slurry polymerization process.

9. The method as claimed in claim 1 wherein the catalyst is dissolved in a diluent and has a solubility in the diluent of at least 95%.

10. The method as claimed in claim 1 wherein the polymerization occurs at a temperature of less than 0° C.

11. The method as claimed in claim 1 wherein the polymerization occurs at a temperature of between −0° C. and the freezing point of the polymerization mixture.

12. The method as claimed in claim 1 wherein the step of dissolving the catalyst occurs prior to mixing the catalyst with the monomer or comonomer mixture.

13. The method as claimed in claim 1 wherein the comonomer mixture comprises a $C_4$ to $C_6$ isoolefin monomer and a multiolefin.

14. A method of producing an isoolefin polymer by polymerization, the method comprising the steps of providing a catalyst system, providing at least one monomer or comonomer mixture comprising at least one isoolefin in a reaction vessel, the reaction vessel having polymerization contact surfaces with an arithmetic average surface roughness of less than 0.3 μm (12 microinches), combining the catalyst system and the polymerizing agent into the reaction vessel, and polymerizing the monomer or comonomer mixture to produce an isoolefin polymer, the polymerization occurring at a temperature of less than 0° C.

15. The method as claimed in claim 14 wherein the reaction vessel has polymerization contact surfaces with an arithmetic average surface roughness of less than 0.2 μm (7.5 microinches).

16. The method as claimed in claim 14, wherein the polymerization contact surfaces have been electropolished to have an arithmetic average surface roughness of less than 0.3 μm (12 microinches).

17. The method as claimed in claim 14 wherein the reaction vessel has polymerization contact surfaces with an arithmetic average surface roughness in the range of 0.10 μm (4 microinches) to 0.2 μm (7.5 microinches).

18. The method as claimed in claim 14 wherein the polymerization temperature is between −10° C. and the freezing point of the polymerization mixture.

19. The method as claimed in claim 14 the polymerization temperature is between −25° C. and −120° C.

20. A method of producing an isoolefin polymer by polymerization, the method comprising the steps of
   a) providing a catalyst system,
   b) providing at least one monomer or comonomer mixture comprising at least one isoolefin in a reaction vessel, the reaction vessel having polymerization contact surfaces, the majority of the polymerization contact surfaces having an arithmetic average surface roughness of less than 0.3 μm (12 microinches),
   c) introducing the catalyst into the reaction vessel,
   d) polymerizing the at least one monomer or comonomer mixture to produce an isoolefin polymer, and
   e) cleaning the reaction vessel, the step of cleaning the reaction vessel comprising refinishing the polymerization contact surfaces to have an arithmetic average surface roughness of less than 0.3 μm (12 microinches)
   wherein either the provided catalyst is dissolved or the polymerization occurs at a temperature of less than 0° C.

* * * * *

UNITED STATES PATENT AND TRADEMARK OFFICE
CERTIFICATE OF CORRECTION

PATENT NO. : 7,557,170 B2 Page 1 of 1
APPLICATION NO. : 12/179375
DATED : July 7, 2009
INVENTOR(S) : Timothy D. Shaffer et al.

It is certified that error appears in the above-identified patent and that said Letters Patent is hereby corrected as shown below:

Title Page; item (75);
Correct inventor name "J. Davis Deborah" to read as --Deborah J. Davis--.

Signed and Sealed this

Eighth Day of September, 2009

David J. Kappos
*Director of the United States Patent and Trademark Office*